US010089265B2

(12) United States Patent
Hsu et al.

(10) Patent No.: US 10,089,265 B2
(45) Date of Patent: Oct. 2, 2018

(54) METHODS AND SYSTEMS FOR HANDLING INTERRUPT REQUESTS (71) Applicant: Mediatek Inc., Hsin-Chu (TW)

(72) Inventors: Chia-Hao Hsu, Changhua County (TW); Shun-Chih Yu, Yilan County (TW); Sen-Yu Cheng, Yilan County (TW)

(73) Assignee: MEDIATEK INC., Hsinchu (TW)

( * ) Notice: Subject to any disclaimer, the term of this patent is extended or adjusted under 35 U.S.C. 154(b) by 103 days.

(21) Appl. No.: 15/186,325

(22) Filed: Jun. 17, 2016

(65) Prior Publication Data

US 2017/0039148 A1    Feb. 9, 2017

Related U.S. Application Data (60) Provisional application No. 62/202,593, filed on Aug. 7, 2015.

(51) Int. Cl.
*G06F 13/24*    (2006.01)
(52) U.S. Cl.
CPC .............. *G06F 13/24* (2013.01); *Y02D 10/14* (2018.01)
(58) Field of Classification Search
None
See application file for complete search history.

(56) References Cited

U.S. PATENT DOCUMENTS

| 5,428,799 | A | 6/1995 | Woods et al. |
| 7,363,409 | B2 | 4/2008 | Ren et al. |
| 7,610,425 | B2 | 10/2009 | Solomita et al. |
| 7,962,679 | B2 | 6/2011 | van de Ven |
| 8,244,947 | B2 | 8/2012 | Shirlen et al. |
| 8,793,423 | B2 | 7/2014 | Zheng |
| 2002/0116563 | A1 | 8/2002 | Lever |
| 2005/0060462 | A1* | 3/2005 | Ota ............... G06F 13/24 710/260 |
| 2006/0095624 | A1* | 5/2006 | Raj ............... G06F 13/24 710/260 |

* cited by examiner

*Primary Examiner* — Idriss N Alrobaye
*Assistant Examiner* — Dayton Lewis-Taylor
(74) *Attorney, Agent, or Firm* — Oblon, McClelland, Maier & Neustadt, L.L.P.

(57) ABSTRACT

Systems, methods, and computer readable medium are provided that improve the management of interrupt requests in multiple processor computer systems. Interrupt requests can be classified into three categories and the structure of the categories provide for specifying a list that needs to be migrated. The list can contain only those interrupt requests that can be handled by some of the processors that will never unplug or based on affinity. When a processor is about to unplug, the computer system can migrate that list. The system can also manage the other interrupt requests.

17 Claims, 5 Drawing Sheets

METHODS AND SYSTEMS FOR HANDLING INTERRUPT REQUESTS

CROSS-REFERENCE TO RELATED APPLICATION

This application claims the benefit of U.S. Provisional Application No. 62/202,593, filed Aug. 7, 2015, the entire disclosure of which is incorporated herein by reference.

FIELD OF THE INVENTION

The present invention relates to computer interrupts, and more particularly to methods and systems for managing computer interrupt requests to reduce interrupt latency and power consumption.

BACKGROUND OF THE INVENTION

Computer systems such as desktop computers, laptop computers, cell phones, smartphones, tablets, personal data assistants, wearables, or other computer based technology can include various devices or components such as multiple central processing units (CPUs), different types of storage, controllers, peripheral devices, or fixed-function logic blocks (configured on a single chip). These devices may utilize interrupt requests to notify an appropriate CPU that an event has occurred or that data is to be transferred between these devices. An interrupt request is a signal which prompts a CPU to stop executing the current instruction routine temporarily and switch to a necessary special routine. In other words, the interrupt request can be used to interrupt the operation of a CPU in order for the CPU to process the task associated with the interrupt request. It provides a tool for prioritizing tasks and for integrating the operation of different components (software or hardware) on a computer system.

In a simple example, in the context of desktop computer, such computer system was often designed to include expansion slots that allow for peripheral cards for various customized applications to be added to the computer system. The peripheral card may have its own on-board processor but it will also need to interact or rely on CPU or memory of the desktop computer. Interrupt requests are sometimes used to signal the CPU to address an event that occurred on the peripheral card.

The nature and volume of interrupt requests and their management has grown more complex over time due for example to increased complexity of computer systems. For example, as a consequence of the rapidly evolving computer industry, more CPUs and devices are added to individual computer systems. As a result, the management and operation of interrupt requests have also become more burdensome. Also, in real time system, since many of the interrupts have to be processed to meet strict real time requirements, it becomes critical to service a large number of interrupts efficiently to reduce interrupt latency and power consumption.

One conventional method of handling interrupt requests is monitoring the current load of interrupt and reassigning an interrupt request from one CPU to another to better distribute the total load among CPUs. In one technique, the system may consider and identify both the CPU with the largest load of interrupt requests and the CPU with the smallest load. The method then may try to move interrupt requests from the CPU with the largest load to the CPU having the smallest load in an attempt to establish a better balance in the computer system. However, this simplistic approach is unable to handle situations such as when an interrupt is taking up 100% of the CPU (e.g., a network controller interrupt) because moving that interrupt to another CPU does not change the fact that one CPU will be dominated by that interrupt. Also, this approach may only look at the highest and lowest load and only try to move one interrupt at a time between that pair of CPUs. In some situations, repeated reassignments results in the same interrupt request being moved back and forth between the same two CPUs, without any overall improvement in the performance of the computer system. In fact, the repeated reassignment of the same interrupt impacts the computer system's performance because the computer system is expending resources to move that interrupt back and forth repeatedly.

Although there are many methods that seek to improve the management and handling of interrupt requests, almost all of them still focus on distributing interrupts based on the interrupt loads on the CPUs. Very few methods have considered issues associated with interrupt migration.

The kernel of Linux performs certain interrupt migration. When a CPU is about to unplug, the system checks every single interrupt in the overall interrupt list and determines if each interrupt in the list is targeted to the CPU about to unplug. If the determination finds that some interrupts are targeted to the CPU about to unplug, the system uses an affinity mask to find another CPU to service those interrupts. If there is an online CPU determined to be suitable by the affinity mask, the system will migrate those interrupts to that CPU. Otherwise the algorithm will route those interrupts to the first online CPU.

This process, however, is inefficient because the algorithm would need to search through the entire interrupt list containing all the interrupts to find the interrupts associated with the unplugged CPU. The number of interrupts for the unplugged CPU is much smaller compared to the total number of interrupts in the interrupt list or from all the CPUs, and searching interrupts not targeted to the unplugged CPU is unnecessary. Therefore, such a process is a waste of the computer system's resource and delays interrupt migration. This problem is even more pronounced as the number of unplugged CPUs increases. For example, when a computer system has M number of CPUs and M−1 number of CPUs to be unplugged and the total number of interrupts in the list is N, the total migration time or latency is (M−1)×N. As M increases, so does the latency.

Accordingly, there is a need for improved methods and systems for migrating interrupts.

SUMMARY OF THE INVENTION

In accordance with one embodiment of the present invention, a computer-implemented method for migrating interrupt requests among multiple processors of a computer system is described. The method may comprise identifying one or more interrupts that need to be migrated for each processor of the multiple processors; creating a list containing the identified interrupts for each processor of the multiple processors; determining a processor of the multiple processors that is about to unplug; and migrating the one or more interrupts in the list to a plugged processor among the multiple processors.

In the above embodiment, the method may further comprise identifying a first group of interrupt requests that can be serviced by any processor of the multiple processors, a second group of interrupt requests that can be serviced only by specific processors of the multiple processors, and a third group of interrupt requests that are the identified interrupt requests that need to be migrated.

In the above embodiment, the list may further contain information indicating a processor candidate for each of the identified one or more interrupt requests that each of the identified one or more interrupt requests will be migrated to.

In the above embodiment, the processor candidate may be determined by checking affinity of the identified interrupt request.

In the above embodiment, the affinity may be a property of the identified interrupt request that enables an online processor of the multiple processors to expediently or efficiently service the identified interrupt request compared to other online processors of the multiple processors.

In the above embodiment, the processor candidate may be the plugged processor.

In the above embodiment, the plugged processor may be a processor that will never be unplugged.

In the above embodiment, the step of identifying one or more interrupts that need to be migrated may perform in response to the step of determining a processor of the multiple processors that is about to unplug.

In the above embodiment, the step of identifying one or more interrupts that need to be migrated may perform before the step of determining a processor of the multiple processors that is about to unplug.

In the above embodiment, the step of migrating the one or more interrupts in the list to a plugged processor may perform in response to the step of determining a processor of the multiple processors that is about to unplug.

Counterpart computer-implemented system and computer-readable medium embodiments would be understood from the above and the overall disclosure. Also, broader, narrower, or different combinations of the described features are contemplated, such that, for example features can be removed or added in a broadening or narrowing way.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which.

DETAILED DESCRIPTION OF THE INVENTION

In accordance with principles of the present invention, systems, methods, and computer readable medium are provided that improves the management and handling of interrupt requests in computer systems.

As a matter of convenience, the description is primarily directed to methods or processes but it is understood to be applicable to systems and computer readable media. The word "interrupt" is sometimes used synonymously with "interrupt request" or "IRQ" as a matter of convenience. The word "migration" is generally used to refer to the process that is required to handle the task of "moving" an interrupt request from an about-to unplug CPU to another CPU that is currently available to handle a queue of interrupt requests.

Embodiments of the present invention, individually or in combination, are directed to processes that manage interrupt requests using interrupt request information when an event triggering the inability to process interrupt requests occurs. Such an event may be when a CPU is about to unplug or about go offline but is not yet unplugged or offline. A process can be implemented by associating categories or assigning classifications to interrupt requests. This can be implemented after a triggering event is detected, or perform the categorization on a periodic or continuous basis. The information is stored, in memory, in association with the interrupt request. The information is used by the process, e.g., when a triggering event is detected, to efficiently and quickly manage pending interrupt requests. Various embodiments are described herein that describe the process, but it should be understood that variations are contemplated.

Three categories of interrupt requests can be defined and the categorization can be stored for each interrupt request. A first category can be interrupt requests that are of the type that can be handled by any of the CPUs in the multi-processor system. A second category can be interrupt requests that are of the type that can only be handled by a particular CPU. The second category of interrupt request are the ones that are specifically transmitted to a particular CPU in a set of multiple processors and are only for that particular CPU to handle. A third category can be interrupt requests that are of the type that, based on their characteristics, one or more of the processors but not all of the processors in the multiple processors are able to handle. This, for example, may involve determining affinity with respect to which ones of the other processors in the multiple processor system can handle that particular interrupt request. sometimes this is referred to as the "affinity group" for convenience. A third category can also be interrupt requests that will be migrated to an online CPU among the multi-processor system.

An example operation in this approach is that the necessary processing only involves identifying and handling the interrupt requests in the third category for the about-to unplug CPU. This is one advantage but there can be other advantages exist from embodiments of the present invention.

As a general matter, the present description will use various similar terms but the meaning will be understood to those of ordinary skill in the art based on the discussion provided herein, based on the plain English usage of the terms, or from an understanding of the terms used in this field art or knowledge of the operation and technology in this field. Therefore, the text and variations in terminology would be understood in view of the context, the overall description, and the figures.

To further elaborate with respect to the present invention(s), embodiments of the present invention are directed to methods for migrating interrupt requests when a corresponding CPU is about to unplug or go offline. The methods focus on migrating interrupts of an about-to unplug or go offline CPU to another plugged or online CPU of a computer system. The methods identify the third category of interrupts on each of the CPUs of the computer system and then make those identified third category interrupts into a list for that CPU. When a CPU of the multiple CPUs is about to unplug, the computer system scans and migrates the interrupts in the list created for that CPU. The computer system can scan and migrate interrupts similarly if additional CPUs of the multiple CPUS are subsequently about to unplug or go offline. Since the number of interrupts in the list is much smaller compared to the global list, the computer system can scan and migrate interrupt requests more efficiently. Such methods and systems reduce migration latency and power consumption of the computer system.

Figure 1:
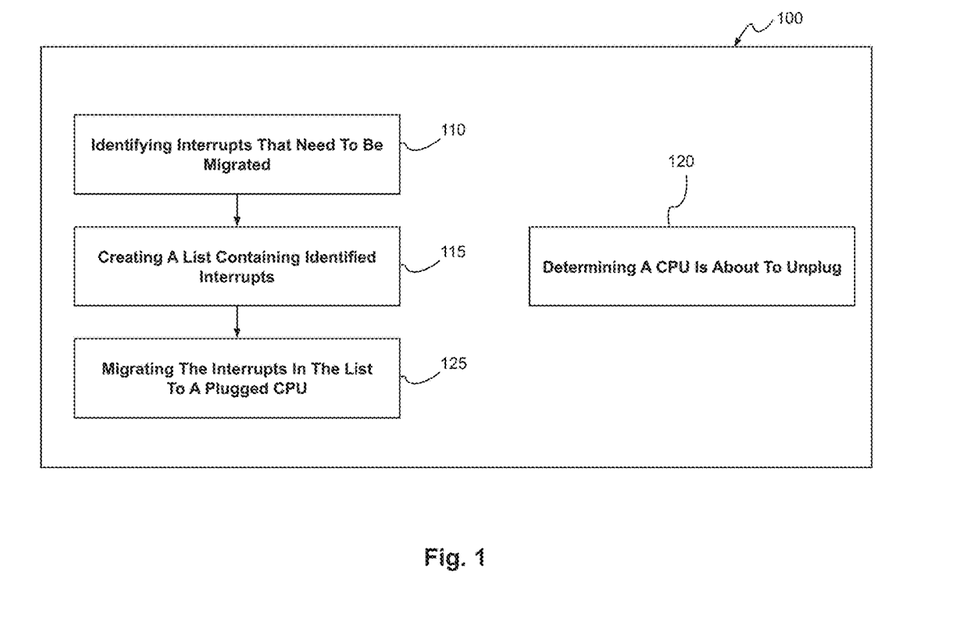
FIG. 1 depicts an illustrative method for migrating interrupt requests in accordance with some embodiments of the present invention.

Referring now to FIG. 1, one embodiment of method 100 for migrating interrupts is illustrated. Method 100 may comprise identifying one or more interrupts that need to be migrated for each CPU of a computer system (step 110), creating a list containing the identified interrupts for each CPU of the computer system (step 115), determining a CPU of the computer system is about to unplug or to go offline (or determining a CPU unplug event is about to occur) (step 120), and migrating the one or more interrupts in the list to a plugged CPU of the computer system (step 1251).

The computer system may be a desktop computer, a laptop computer, a cell phone, a tablet, a personal data assistant, and other computer system that comprises multiple CPUs. The sources of interrupt requests on the computer system may be any device external to the multiple CPUs that is part of the computer system and can generate and transmit an interrupt request. For example, the one or more sources may include, but are not limited to, disk drives, keyboards, cursor control devices such as mice and trackballs, printers, USB ports, and network controllers. Other types of sources are also contemplated. Each of the sources may generate any number of different interrupts. Each of the multiple CPUs may refer to a CPU having a single core, a CPU having multiple cores, or a core in a multi-core CPU.

The one or more interrupts may be received from the one or more interrupt sources after they are generated. The one or more interrupts may also be received by inquiring each of the one or more interrupt sources. The inquiring process may occur when the computer system is first powered up and the operating system may inquire each of the one or more interrupt sources to discover interrupts from each interrupt source. The one or more interrupts may be stored in memory or a registry and be available for access during identifying step 115. Method 100 may also receive additional interrupts if additional interrupts are generated or if additional devices are added to the computer system. The one or more interrupt requests may refer to interrupt requests currently pending for handling by a particular CPU.

For example, the computer system may be a desktop computer having ten CPUs designated as CPU0-CPU10, a first interrupt source such as a disk drive that generates an X number of interrupts designated by DD_IRQ_0-DD_IRQ_X, and a second interrupt source network controller that generates a Y number of interrupts designated by NC_IRQ_0-NC_IRQ_Y. The number and kind of interrupts of each interrupt source may be determined when they are generated by each device or by the inquiring process. Each interrupt source may send a certain number of interrupts to each or some of the ten CPUs. For instance, DD_IRQ_0 may be sent to CPU0, DD_IRQ_1 may be sent to CPU1, and so forth, and NC_IRQ_0 may be sent to CPU0, NC_IRQ_1 may be sent to CPU1, and so forth.

In step 120, the term "CPU that is about to unplug" or "about to unplug" refers to a plugged CPU that knows (based on a signal, an indicator, or an instruction) it will soon undergo or that is undergoing a process to reach the unplug state but is not yet in the unplugged state. The process includes a process for preparing the plugged CPU to unplug or a process shutting down the operation of the plugged CPU. The plugged CPU may know that it will soon undergo the process when it receives an instruction from the computer system or the operating system ordering it to unplug. The plugged CPU may also know that it will soon undergo the process when it instructs itself to unplug on its own initiative. A CPU that is about to unplug may also refer to a CPU that is about to offline in that the term "unplug" and term "offline" may be used interchangeably. A plugged CPU refers to a CPU that is powered operating in the computer system and is operational to execute interrupt requests or instructions in their intended way.

For example, a CPU that is about to unplug may be a CPU that has received an instruction from the computer system or the operating system ordering it to unplug (about-to-unplug instruction) but is not yet unplugged. For another example, a CPU that is about to unplug may be a CPU that has sent an indication to the computer system or the operating system that it will soon undergo the process to prepare the CPU to unplug or to shut down the CPU (about-to-unplug indication) but is not yet unplugged. For yet another example, a CPU that is about to unplug may be a CPU determined by the computer system or the operating system that it will soon undergo the process to prepare the CPU to unplug or to shut down the CPU but is not yet unplugged, without the computer system or the operating system sending the about-to-unplug instruction or the CPU sending the about-to-unplug indication.

Method 100 may determine a CPU is about to unplug when the computer system or the operating system sends the about-to-unplug instruction to the CPU. Method 100 may also determine a CPU is about to unplug when the computer system or the operating system receives the about-to-unplug indication from the CPU. Method 100 may also determine a CPU is about to unplug by configuring the computer system or the operating system to check the operation of the CPU and determine if there are any signs or information that reveal that the CPU is about to unplug, regardless whether or not the computer system or the operating system sends the about-to-unplug instruction or the CPU sends the about-to-unplug indication.

Unplugging a CPU may refer to any process rendering the CPU incapable of servicing any interrupt. It may be an activity that breaks the electrical connection between a CPU and a power source such that the CPU is inoperable because it is not receiving power from the power source. Unplugging a CPU may also refer to a process that disconnects or removes a CPU from the computer system. Unplugging a CPU may also refer to a process that reduces the power supplied to a CPU from a power source, reduces the CPU processing speed, or causes a CPU to enter into a mode (e.g., power saving mode, a sleep mode, hibernation mode, etc.) such that the CPU is unable to service any interrupt. Similarly, an unplugged CPU may refer to a CPU that is incapable of serving any interrupt. An unplugged CPU may be referred to as an offline CPU. Conversely, a plugged CPU may refer to a CPU that is capable of serving an interrupt. A plugged CPU may be referred to as an online CPU. Method 100 may determine or detect if one or more unplugging events (or activity) have occurred and which ones of the CPUs are currently offline, in addition to determining a CPU is about to unplug. Method 100 may determine that an unplugging process has occurred by various techniques such as based on processing state of the CPU or if the system is unable to communicate with the CPU.

In step 110, the identifying step may execute in response to the determination in step 120 or before the determination step 120. When method 100 determines that a CPU is about to unplug, step 110 may identify interrupts on each CPU of the computer system as groups of interrupts. Method 100 may also identify interrupts on each CPU of the computer system as groups of interrupts on a periodic or continuous basis. Identifying interrupts on a periodic or continuous basis may occur before the determination step 120. The groups of interrupts may comprise a first group of interrupt requests with each interrupt request that can be serviced by any CPU of the computer system, a second group of interrupts with each interrupt request that can only be serviced by a specific CPU of the computer system, and a third group of interrupts containing the remaining interrupts that would be considered to be the affinity group.

The first group or each interrupt in the first group may be referred to as target-all IRQ or TA-IRQ. Each interrupt in the first group is unconcerned about which CPU will service it when the CPU on which the three groups are identified (or identified CPU) is plugged or unplugged because it can be serviced by any CPU. Most of the interrupts on each CPU fall into the first group because this is the default setting of most interrupts or devices unless the user of the computer system, the device, or the driver of the device specifically requires an interrupt to be transmitted to a specific CPU. In general, more than 90% of the interrupts on each CPU are in this category.

The second group or each interrupt in the second group may be referred to as specific IRQ or S-IRQ. Some of the interrupts on each CPU are in this category. Each interrupt in the second group can only be serviced by a specific CPU and cannot be serviced by any other online CPU when the CPU on which the three groups are identified (or identified CPU) is unplugged.

In either the first or second group, the interrupts do not need to be migrated when the CPU on which the three groups are identified (or identified CPU) is unplugged because, in the first group, they can find any other online CPUs to service them due to their default setting or interrupt type and, in the second group, they do not need to find any other online CPUs to service them (because those IRQs can only be handled by that specific CPU that was unplugged).

The third group may be referred to as migrating IRQ or M-IRQ, and it has a much smaller number of interrupts compared to the first group. The third group contains interrupts that need to be migrated when the CPU on which the three groups are identified (or identified CPU) is unplugged. The identified CPU mentioned in the first group, second group, and third group refer to the same CPU. The identified CPU is one of many CPUs on the computer system and the interrupts on each of the remaining CPUs may be similarly identified. The identified CPU may sometimes be referred to as a default CPU. A default CPU may refer to a CPU assigned by the default setting of the interrupt or the interrupt source to service some interrupts. The default setting may be established during a design, manufacturing, or programming phase that occurred before the interrupt source is implemented on the computer system or by the driver of the interrupt source. A default CPU may also refer to a CPU that services all the interrupts on that CPU (all three groups), rather a CPU that services received or migrated interrupts from the third group coming from another CPU. The CPU that services received or migrated interrupts only services some of the interrupts, rather than all, coming from the CPU that services all the interrupts.

There are advantages to the individual categories. For example, TA-IRQ can provide the advantage that IRQs that are in that category can be identified and handled by another CPU while servicing an existing hardware task that may have blocked the flow of IRQs in the processor. Allowing the TA-IRQ to be handled as such can avoid potentially the need to reboot hardware. It should be understood that IRQs include FIQs or other types of IRQs.

Figure 2A:
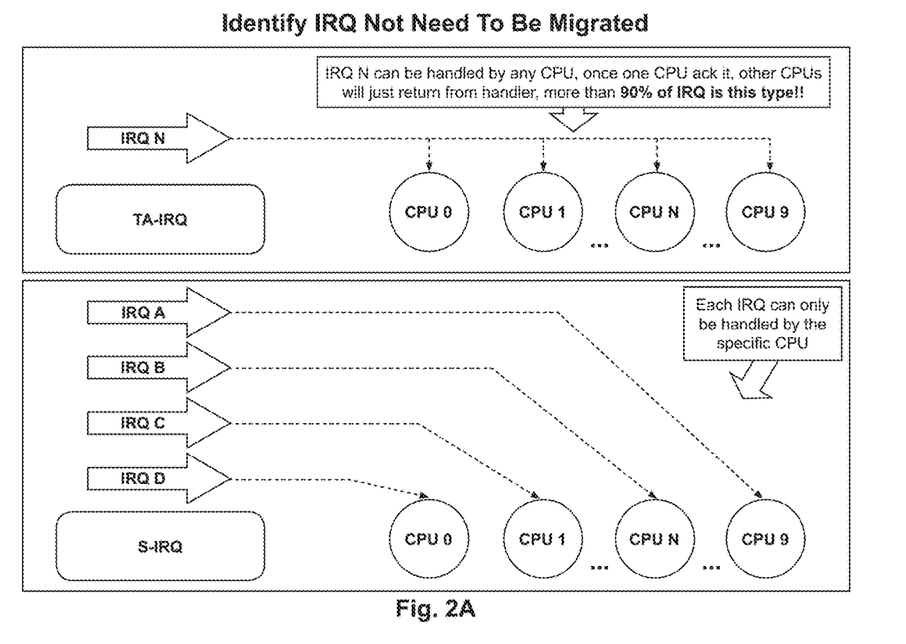
FIG. 2A-2B depict example interrupts for each group of interrupts in a computer system having ten CPUs and a total of eight interrupts in accordance with some embodiments of the present invention.
Figure 2B:
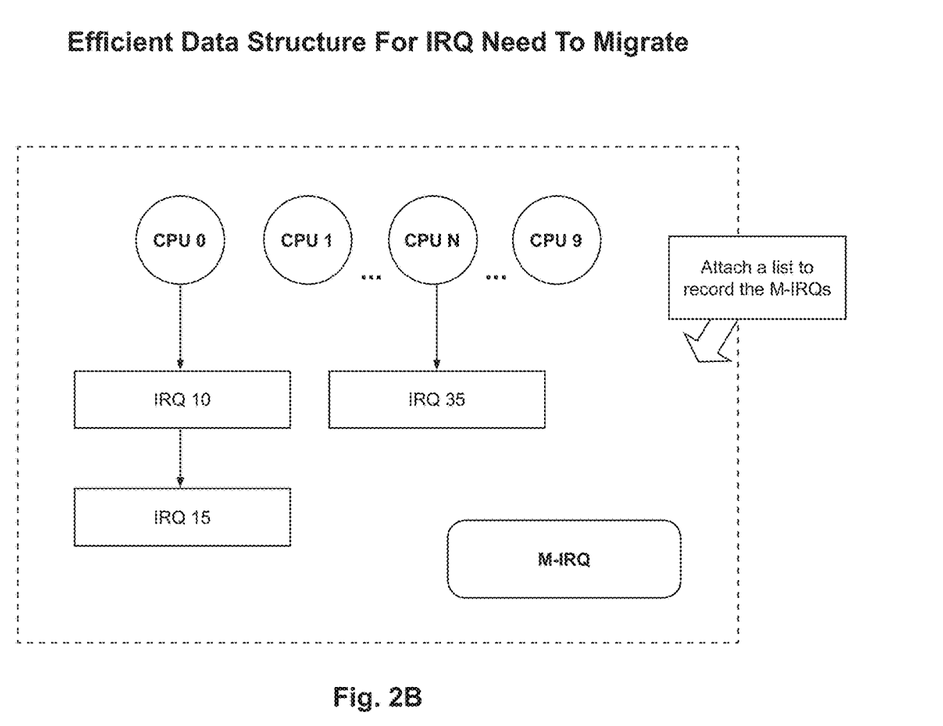

FIGS. 2A-2B illustrate example interrupts for each group of interrupts in a computer system having ten CPUs (CPU 0-CPU 9) and a total of eight interrupts (IRQ N, IRQ A, IRQ B, IRQ C, IRQ D, IRQ 10, IRQ 15, and IRQ 35). IRQ N is an example interrupt of the first group and it may be handled by any of the CPU 0-CPU 9. IRQ A, IRQ B, IRQ C, and IRQ D are example interrupts of the second group and each may be handled by only CPU 9, CPU N, CPU 1, and CPU 0, respectively. IRQ 10, IRQ 15, and IRQ 35 are examples of the third group and they are the interrupts that need to be migrated.

The discussion will continue to refer to FIG. 1 in the context of the other figures. In step 115, method 100 may create a list for each CPU. The list contains interrupts from the third group. The total number of interrupts in all of the created lists is the total number of interrupts in the third group. Creating a list for each CPU may refer to a process of identifying interrupts from the third group on that CPU.

Each list may further contain CPU candidate information that indicates CPU candidates to which the interrupts in the list will be migrated. The CPU candidates may be determined while the list is being created, and may comprise checking the affinity of each interrupt in the list. Affinity may refer to a property of the interrupt that enables one of the online CPUs to more expediently or efficiently service (e.g., shorter servicing time or utilizing less resources on the computer system) the interrupt compared to other online CPUs. CPU candidates may be plugged CPUs.

In step 125, the interrupts in the list may be migrated to their corresponding CPU candidates when the list contains CPU candidate information. Regardless whether or not the list includes CPU candidate information, the interrupts in the list may also be migrated to a CPU that will never be unplugged (except when the computer system is powered off). When the interrupts in the list are migrated to a CPU that will never be unplugged, the affinity of the interrupt may be irrelevant. When the interrupts in the list are migrated to a CPU that will never be unplugged, the interrupts in the list for each CPU may all be migrated to the same CPU that will never be unplugged. Migrating step 125 may perform when the identified CPU is about to unplug that is not yet unplugged.

Identifying step 110 and creating step 115 may perform before or after determining step 120. In the first case, when identifying step 110 and creating step 115 perform before determining step 120, identifying step 110 and creating step 115 may perform on a periodic or continuous basis. When determining step 120 occurs after identifying step 110 and creating step 115, the interrupts in the list then may be migrated. In other words, migrating step 125 may perform in response to determining step 120. In the second case, when identifying step 110 and creating step 115 perform after determining step 120, identifying step 110 and creating step 115 may be executed only if determining step 120 occurs. The interrupts in the list then may be migrated. Other orders of steps 110, 115, 120, and 125 are also contemplated.

Figure 3:
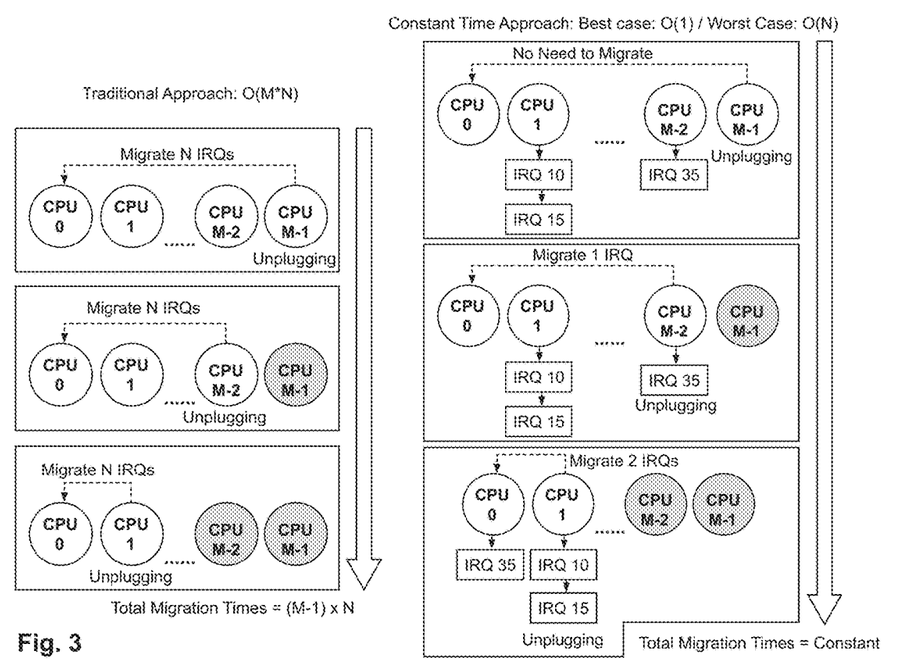
FIG. 3 depicts example migrations for a computer system having m CPUs with m−1 CPUs that are about to unplug in accordance with some embodiments of the present invention.

FIG. 3 illustrates examples of migrations for a computer system having m CPUs where m−1 CPUs are about to unplug in a sequence. The figure on the right illustrates migrating step 125. In particular, the figure on the right illustrates migrating interrupts to a plugged CPU that will not be unplugged (except when the computer system is power off). When CPUm−1 is about to unplug, migration is unnecessary for CPUm−1 because no list was created for CPUm−1 or there are no pending interrupt requests that have CPUm−1 as its specific or default processor. As such, CPUm−1 is not a default CPU to any of the interrupts in the third group. When CPUm−2 is about to unplug, method 100 scans through the list created for CPUm−2 and migrates each interrupt in the list to CPU0, which is a plugged CPU that will not be unplugged (except when the computer system is power off). The list contains IRQ 35 and IRQ 35 is then migrated to CPU0. A list was created for CPUm−2 because CPUm−2 is the default CPU of IRQ 35 which is an interrupt from the third group. The CPUs between CPUm−2 and CPU1 may be about to unplug similarly in a sequence and the interrupts of those CPUs may be similarly migrated using lists created for those CPUs. When the second to last CPU, CPU1, is about to unplug, the method scans through the list created for CPU1 and migrates each interrupt in the list to CPU0. The list contains IRQ 10 and IRQ 15, and both IRQs are migrated to CPU0. CPU0 may also be a CPU candidate determined based on checking the interrupt's affinity if there are more CPUs on the computer system or if there are other plugged CPUs that will not be unplugged.

Method 100 is more efficient compared to the traditional migration algorithm employed by some operating systems. For a computer system having a number of CPUs with a number of CPUs about to unplug, the total migration time of method 100 is determined by the number of interrupts in the third group or the number of interrupts in the list(s). In the worst case scenario, the total migration time is the total time to migrate all the interrupts in the third group. For example, when the computer system has 10 CPUs with 9 CPUs that are about to unplug and the list for each of the 9 CPUs has a number of third group interrupts, the total migration time would be the total time to migrate all those interrupts from the 9 CPUs to a plugged CPU that will never be unplugged or a CPU candidate. In the best case scenario, the total migration time is the total time required to migrate only one interrupt from all of the 9 CPUs. For example, when the computer system has 10 CPUs with 1 CPU about to unplug and the list for that CPU contains only one interrupt, the total migration time would be the time to migrate the one interrupt from that CPU to a plugged CPU that will never be unplugged or a CPU candidate. In either scenario, or any other scenario, the total migration time is a constant because the number of interrupts in the third group or the number of interrupts in the list(s) is fixed after the third group of interrupts is identified or after the list(s) is created. In contrast, the traditional migration algorithm in the same scenarios require much longer time. As discussed earlier, the total migration time for the prior art algorithm, which is shown in the depiction on the left of FIG. 3, is the number of CPUs that are about to unplug times the total number of interrupts in the overall interrupt list. Therefore, the total migration time increases as the number of CPUs that about to unplug increases and the total migration time is not a constant. The overall interrupt list is also much larger than the list for each CPU.

Since interrupt latency is reduced, the power consumption of the computer system is also reduced because shorter migration time and migrating a less number of interrupts involve less processing power. FIG. 3 also shows this comparison.

Figure 4:
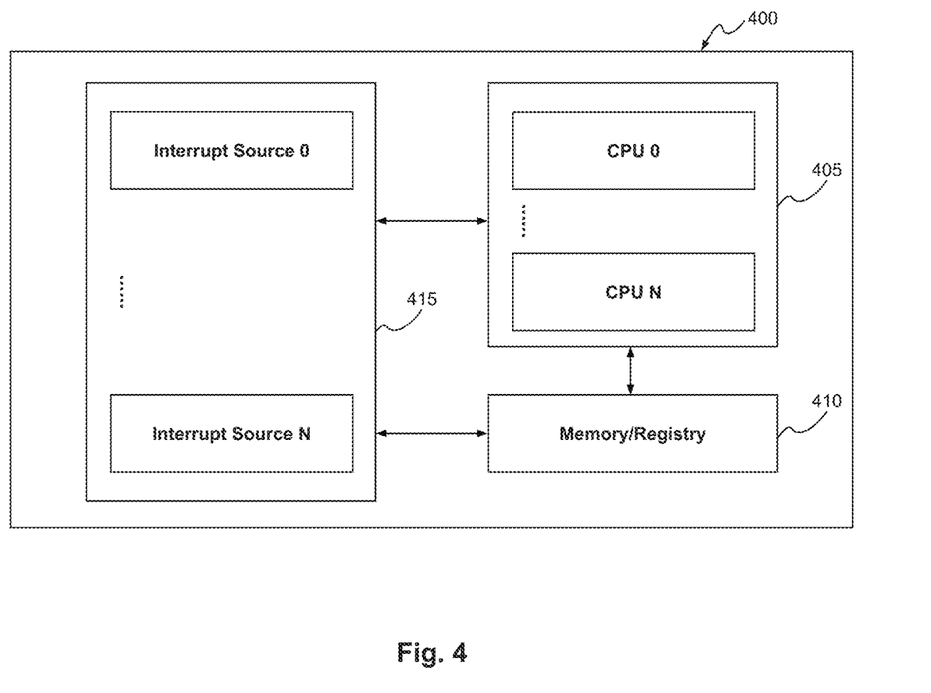
FIG. 4 depicts an illustrative computer system in accordance with some embodiments of the present invention.

FIG. 4 illustrates one embodiment of a computer system 400. Computer system 400 may comprise CPUs 405, memory or registry 410 for storing instructions and data, and a plurality of interrupt sources 415 that generate interrupts. The plurality of interrupt sources 415 may generate and transmit interrupts directly to the CPUs 405 or to the memory 410. The stored instructions may comprise instructions for performing processes illustratively described herein that are executable by one or more of the CPUs 405 and the stored data may be interrupt requests and related data. Thus, in some embodiments, method 100 may be implemented on a hardware system of computer system 400 such as the CPUs and memory. In some embodiments, method. 100 may be implemented on a software system of the computer system such as an operating system configured to perform method 100. In some embodiments, method 100 may be implemented on both the hardware system and software system. Preferably, method 100 is implemented in the kernel of an operating system or a computer program that manages input/output requests from applications and translates them into data processing instructions for the CPU and interrupt sources of the computer system.

In operation, the embodiments of the process are implemented by apply computer readable instructions stored in non-transient or non-volatile memory (e.g., ROM, hard drive, etc.) to the hardware of the computer system (e.g., the processors). In operation, transient or volatile memory may be used to carry out the process in accordance with the computer readable instructions stored in non-transient memory.

In application, embodiments of the present invention incorporate an interrupt controller as part of the system.

It should be understood that the process is implemented by performing processing on the computer system in accordance with embodiments of the present invention, which would typically the use of stored data and computer executable instructions.

It is understood from the above description that the functionality and features of the systems, devices, or methods of embodiments of the present invention include generating and sending signals to accomplish the actions.

It should be understood that variations, clarifications, or modifications are contemplated. Applications of the technology to other fields are also contemplated.

Exemplary systems, devices, and methods are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention.

Thus, for example, any sequence(s) and/or temporal order of steps of various processes or methods (or sequence of device connections or operation) that are described herein are illustrative and should not be interpreted as being restrictive. Accordingly, it should be understood that although steps of various processes or methods or connections or sequence of operations may be shown and described as being in a sequence or temporal order, but they are not necessarily limited to being carried out in any particular sequence or order. For example, the steps in such processes or methods generally may be carried out in various different sequences and orders, while still falling within the scope of the present invention. Moreover, in some discussions, it would be evident to those of ordinary skill in the art that a subsequent action, process, or feature is in response to an earlier action, process, or feature.

It is also implicit and understood that the applications or systems illustratively described herein provide computer-implemented functionality that automatically performs a process or process steps unless the description explicitly describes user intervention or manual operation.

It should be understood that claims that include fewer limitations, broader claims, such as claims without requiring a certain feature or process step in the appended claim or in the specification, clarifications to the claim elements, different combinations, and alternative implementations based on the specification, or different uses, are also contemplated by the embodiments of the present invention.

It should be understood that combinations of described features or steps are contemplated even if they are not described directly together or not in the same context.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A computer-implemented method for migrating interrupt requests among multiple processors of a computer system comprising:
    identifying one or more interrupts that need to be migrated for each processor of the multiple processors;
    identifying a first group of interrupt requests that can be serviced by any processor of the multiple processors, a second group of interrupt requests that can be serviced only by specific processors of the multiple processors, and a third group of interrupt requests that are the identified interrupt requests that need to be migrated;
    creating a list containing the identified interrupts for each processor of the multiple processors;
    determining a processor of the multiple processors that is about to unplug; and
    migrating the one or more interrupts in the list of the processor about-to-unplug to a plugged processor among the multiple processors.

2. The method according to claim 1, wherein the list further contains information indicating a processor candidate for each of the identified one or more interrupt requests that each of the identified one or more interrupt requests will be migrated to.

3. The method according to claim 2, wherein the processor candidate is determined by checking affinity of the identified interrupt request.

4. The method according to claim 3, wherein the affinity is a property of the identified interrupt request that enables an online processor of the multiple processors to expediently or efficiently service the identified interrupt request compared to other online processors of the multiple processors.

5. The method according to claim 4, wherein the processor candidate is the plugged processor.

6. The method according to claim 1, wherein the plugged processor is a processor that will never be unplugged.

7. The method according to claim 1, wherein the step of identifying one or more interrupts that need to be migrated performs in response to the step of determining a processor of the multiple processors that is about to unplug.

8. The method according to claim 1, wherein the step of identifying one or more interrupts that need to be migrated performs before the step of determining a processor of the multiple processors that is about to unplug.

9. The method according to claim 8, wherein the step of migrating the one or more interrupts in the list to a plugged processor performs in response to the step of determining a processor of the multiple processors that is about to unplug.

10. A computer-implemented system for migrating interrupt requests on a computer system comprising:
    a computer system comprising multiple processors and a memory that stores instructions that when executed causes the computer system to:
        identify one or more interrupts that need to be migrated for each processor of the multiple processors;
        identify a first group of interrupt requests that can be serviced by any processor of the multiple processors, a second group of interrupt requests that can be serviced only by specific processors of the multiple processors, and a third group of interrupt requests that are the identified interrupt requests that need to be migrated;
        create a list containing the identified interrupts for each processor of the multiple processors;
        determine a processor of the multiple processors that is about to unplug; and
        migrate the one or more interrupts in the list of the processor about-to-unplug to a plugged processor among the multiple processors.

11. The method according to claim 10, wherein the step of identifying one or more interrupts that need to be migrated performs in response to the step of determining a processor of the multiple processors that is about to unplug.

12. The method according to claim 10, wherein the step of identifying one or more interrupts that need to be migrated performs before the step of determining a processor of the multiple processors that is about to unplug.

13. The method according to claim 12, wherein the step of migrating the one or more interrupts in the list to a plugged processor performs in response to the step of determining a processor of the multiple processors that is about to unplug.

14. A non-transitory computer readable medium storing a computer executable instructions that when executed causes a computer system comprising multiple processors to perform steps comprising:
    receiving one or more interrupts from one or more interrupt sources of the computer system;
    identifying one or more interrupts that need to be migrated for each processor of the multiple processors;
    identifying a first group of interrupt requests that can be serviced by any processor of the multiple processors, a second group of interrupt requests that can be serviced only by specific processors of the multiple processors, and a third group of interrupt requests that are the identified interrupt requests that need to be migrated;
    creating a list containing the identified interrupts for each processor of the multiple processors;
    determining a processor of the multiple processors that is about to unplug; and
    migrating the one or more interrupts in the list of the processor about-to-unplug to a plugged processor among the multiple processors.

15. The computer readable medium according to claim 14, wherein the step of identifying one or more interrupts that need to be migrated performs in response to the step of determining a processor of the multiple processors that is about to unplug.

16. The computer readable medium according to claim 14, wherein the step of identifying one or more interrupts that need to be migrated performs before the step of determining a processor of the multiple processors that is about to unplug.

17. The method according to claim 16, wherein the step of migrating the one or more interrupts in the list to a plugged processor performs in response to the step of determining a processor of the multiple processors that is about to unplug.

\* \* \* \* \*